US009736233B2

United States Patent
Yamada (10) Patent No.: US 9,736,233 B2
(45) Date of Patent: Aug. 15, 2017

(54) COMMUNICATION SYSTEM AND, COMMUNICATION DEVICE AND PROCESSOR CONFIGURING THE COMMUNICATION SYSTEM

(71) Applicant: DENSO CORPORATION, Kariya, Aichi-pref. (JP)

(72) Inventor: Teruya Yamada, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 137 days.

(21) Appl. No.: 14/437,019

(22) PCT Filed: Sep. 25, 2013

(86) PCT No.: PCT/JP2013/005668
§ 371 (c)(1),
(2) Date: Apr. 20, 2015

(87) PCT Pub. No.: WO2014/068841
PCT Pub. Date: May 8, 2014

(65) Prior Publication Data
US 2015/0296001 A1    Oct. 15, 2015

(30) Foreign Application Priority Data

Nov. 2, 2012    (JP) .................................. 2012-242726

(51) Int. Cl.
G06F 15/16    (2006.01)
H04L 29/08    (2006.01)
(Continued)

(52) U.S. Cl.
CPC ........... *H04L 67/101* (2013.01); *G08G 1/093* (2013.01); *H04L 47/783* (2013.01); *H04L 67/12* (2013.01); *H04L 67/2861* (2013.01)

(58) Field of Classification Search
CPC ......... H04N 21/2343; H04N 21/23439; H04N 21/2402; H04N 21/4425; H04N 21/4623;
(Continued)

(56) References Cited

U.S. PATENT DOCUMENTS 7,349,407 B1    3/2008    Takamatsuya et al.
2009/0227263 A1*    9/2009    Agrawal ............... H04W 16/16
455/452.1
(Continued)

FOREIGN PATENT DOCUMENTS

JP    2003115890 A    4/2003
JP    2006295454 A    10/2006
(Continued)

OTHER PUBLICATIONS

International Search Report and Written Opinion (in Japanese with English Translation) for PCT/JP2013/005668, mailed Nov. 5, 2013; ISA/JP.

*Primary Examiner* — Djenane Bayard
(74) *Attorney, Agent, or Firm* — Harness, Dickey & Pierce, P.L.C.

(57) ABSTRACT

A communication system includes: a communication device that receives data from a road-side apparatus and transmits the data as a plurality of data items in block units; and a processor that starts data processing whenever it is determined that a data item is received. The communication device includes a determination device that determines whether load reduction in the data processing is required, and a transmission device that transmits the plurality of data items as a series of data items such that it is not determined that a data item has been received when the load reduction is required. The processor includes an assembly device that divides the series of data items and assemblies the divided data.

5 Claims, 6 Drawing Sheets

(51) Int. Cl.
*G08G 1/09* (2006.01)
*H04L 12/911* (2013.01)

(58) Field of Classification Search
CPC ...... H04N 21/8456; H04L 2029/06054; H04L 67/2842; H04L 67/101; H04L 41/5012; H04L 67/1097
See application file for complete search history.

(56) References Cited

U.S. PATENT DOCUMENTS

| | | | |
|---|---|---|---|
| 2010/0266045 A1* | 10/2010 | Katzur | H04N 19/176 375/240.16 |
| 2010/0281010 A1* | 11/2010 | Yamamoto | H04L 12/40013 707/705 |
| 2011/0007693 A1* | 1/2011 | Frusina | H04L 5/003 370/329 |
| 2013/0298170 A1* | 11/2013 | ElArabawy | H04W 28/0231 725/62 |

FOREIGN PATENT DOCUMENTS

| | | |
|---|---|---|
| JP | 2007079917 A | 3/2007 |
| JP | 2009123083 A | 6/2009 |
| JP | 2012105055 A | 5/2012 |
| JP | 2012199816 A | 10/2012 |

\* cited by examiner

COMMUNICATION SYSTEM AND, COMMUNICATION DEVICE AND PROCESSOR CONFIGURING THE COMMUNICATION SYSTEM

CROSS REFERENCE TO RELATED APPLICATIONS

This application is a U.S. National Phase Application under 35 U.S.C. 371 of International Application No. PCT/JP2013/005668 filed on Sep. 25, 2013 and published in Japanese as WO 2014/068841 A1 on May 8, 2014. This application is based on and claims the benefit of priority from Japanese Patent Application No. 2012-242726 filed on Nov. 2, 2012. The entire disclosures of all of the above applications are incorporated herein by reference.

TECHNICAL FIELD

The present disclosure relates to a communication system for receiving data from a road-side apparatus to be placed on a road and performing an instruction or the like, and a communication device and a processor configuring the communication system.

BACKGROUND ART

Data communication with use of DSRC (Dedicated Short Range Communication) has been conventionally utilized. DSRC is a wireless communication technique designed for vehicle communication specifically. DSRC is utilized by ITS (Intelligent Transport Systems), and it may be a broadcast service such as VICS (Vehicle Information and Communication Systems), or an individual communication service such as ETC (Electronic Toll Collection Systems).

For an individual communication service such as an ETC herein, since two-way data communication is performed between an on-road apparatus and a vehicle-side DSRC on-vehicle apparatus and a response is verified mutually, it is possible to keep the on-road apparatus wait when having a heavy on-vehicle processing load.

However, for a broadcast communication service such as VICS, since one-way data communication is transmitted from the on-road apparatus to the vehicle-side DSRC on-vehicle apparatus, there is a possibility that data cannot be processed when having a heavy on-vehicle processing load.

To solve the problem, a DSRC on-vehicle apparatus responding to the situation that exceeds processing capacities temporarily for processing data (i.e., "broadcast data") of the broadcast communication service has been proposed in recent years (for example, see Patent Literature 1).

The communication device such as a DSRC on-vehicle apparatus receives broadcast data; however, the apparatus (hereinafter referred to as "processor") for performing guide processing based on the received data is generally formed as a separate configuration. For example, broadcast data such as VICS is received at a DSRC on-vehicle apparatus from the road-side apparatus and transferred to a navigation apparatus, and then guide processing is performed in the navigation apparatus. Therefore, it is possible to purchase a DSRC on-vehicle apparatus later apart from a navigation apparatus. The communication device such as a DSRC on-vehicle apparatus and the processor such as a navigation apparatus are connected by a USB (Universal Serial Bus).

The Patent Literature 1 proposes how to receive broadcast data from a road-side apparatus in a DSRC on-vehicle apparatus.

However, when a DSRC on-vehicle apparatus transmits data to a navigation apparatus as described above, even when it is possible to receive data from a road-side apparatus in a DSRC on-vehicle apparatus as the processing load of a CPU in the navigation apparatus gets larger, there is a possibility that processing cannot be performed in the navigation apparatus. Thus, it is required to increase the processing capability of the CPU in the navigation apparatus. In addition, to realize a variety of functions other than the collaboration with the DSRC on-vehicle apparatus in the navigation apparatus, it is required to select a CPU by taking account of the realization of these functions. Accordingly, a processing load becomes a burden just before shipping of a navigation apparatus, and the reselecting of a CPU may happen as well.

It is noted that the burden is not necessarily restricted to data communication with use of DSRC, the similar burden may be generated when a communication device transmits the received data to a processor.

PRIOR ART LITERATURES

Patent Literature

Patent Literature 1: JP-2012-105055-A

SUMMARY OF INVENTION

It is an object of the present disclosure to provide a communication system for certainly transmitting data even when a processing load in a processor gets larger when a communication device transmits data to the processor; and a communication device and a processor for configuring the communication system.

According to a first aspect of the present disclosure, a communication system includes: a communication device for receiving data from a road-side apparatus to be placed on a road and transmitting the data as a plurality of data items in block units; and a processor, which is connected to the communication device for data communication, for starting data processing whenever it is determined that the data items in block units are received from the communication device. The communication device includes: a determination device for determining whether load reduction in the data processing performed by the processor is required; and a transmission device for transmitting the plurality of data items such that it is not determined that the data items in blocks units are received in the processor when it is determined that the load reduction is required in the determination device. The processor includes an assembly device that divides the plurality of data items to be transmitted as the series of data items in the transmission device and assemblies the divided data.

For example, when a communication device and a processor are connected by a USB, the processor determines that data in block units is received when data of a fractional unit less than a transfer unit is transferred under a condition that the data in block units is transferred by 64 bytes as a transfer unit. Therefore, it is considered that the transmission device in the communication device transmits a plurality of pieces of data such that a block unit is a multiple of a transfer unit.

Alternatively, when a communication device and a processor are connected by a USB, the processor determines that data in block units is received according to a NULL packet as end information indicative of the end of a block unit. Therefore, it is considered that the transmission device in the communication device transmits a plurality of pieces of data such that a NULL packet is not added.

In other words, a processor performs data processing whenever it is determined that data in block units is received. However, the occurrence of data processing on each block unit is restricted to prevent the processor from determining data reception in block units at the time of heavy-load. Accordingly, when the communication device transmits data to the processor, data can be surely transmitted even when a processing load in the processor gets larger.

According to a second aspect of the present disclosure, a communication device receives data from a road-side apparatus to be placed on a road, and transmits the data as a plurality of data items in block units. The communication device is used with a processor, which is connected to the communication device for data communication, for starting data processing whenever it is determined that the data items in block units are received from the communication device. The processor includes an assembly device that divides a plurality of data items to be transmitted as a series of data items from the communication device and assemblies the divided data. The communication device includes: a determination device for determining whether load reduction in the data processing performed by the processor is required; and a transmission device for transmitting the plurality of data items as a series of data items such that the reception of the data items in block units is not determined in the processor when it is determined that the load reduction is required in the determination device.

The above communication device is capable of transmitting data certainly even when load reduction in a processor gets larger when the communication device transmits data to the processor.

According to a third aspect of the present disclosure, a processor receives data from a road-side apparatus to be placed on a road and is used with a communication device for transmitting the data as a plurality of data items in block units. The processor, which is connected to the communication device for data communication, starts data processing whenever it is determined that the data items are from the communication device. The communication device includes a determination device for determining whether load reduction in the data processing of the processor is required; and a transmission device for transmitting the plurality of data items as a series of data items such that the reception of the data items is not determined in the processor. A processor includes an assembly device that divides the plurality of pieces of data to be transmitted as the series of data items in the transmission device and assemblies the divided data.

The above processor is capable of transmitting data certainly even when a processing load in the processor gets larger when the communication device transmits data to the processor.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following describes an aspect of the present disclosure with reference to the drawings.

Figure 1:
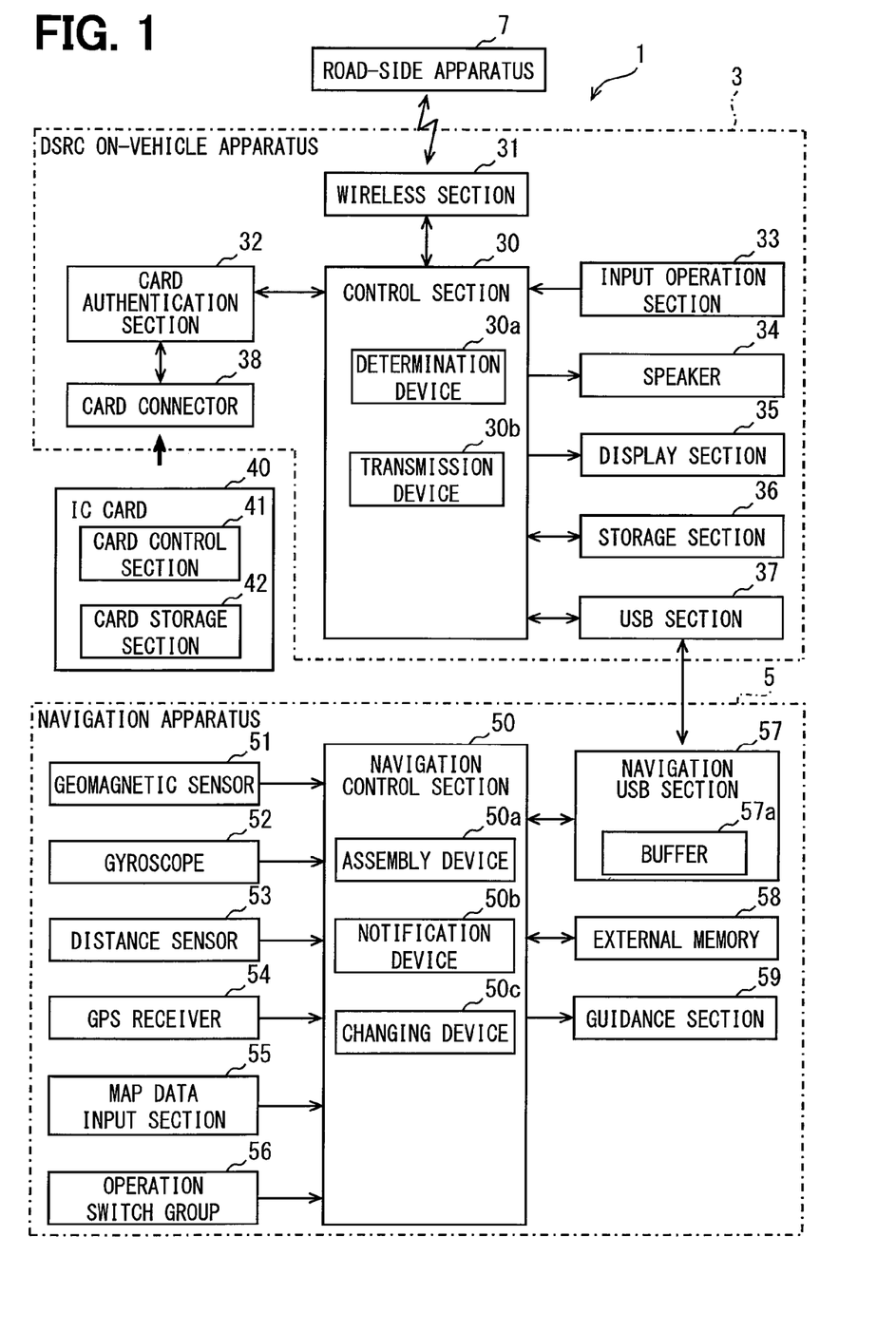
FIG. 1 is a block diagram showing a schematic configuration of a communication system.

A communication system 1 shown in FIG. 1 includes a DSRC on-vehicle apparatus 3 mounted on a vehicle, and a navigation apparatus 5.

The DSRC on-vehicle apparatus 3 is mainly constituted by a control section 30. The control section 30 is configured as a so-called computer system, and includes a CPU, a ROM, a RAM, an I/O and a bus line connecting them. A wireless section 31, a card authentication section 32, an input operation section 33, a speaker 34, a display section 35, a storage section 36 and a USB section 37 are connected to this control section 30.

The wireless section 31 is a configuration for performing data communication with a road-side apparatus 7 to be placed on a road. For example, the road-side apparatus 7 transmits broadcast data such as VICS data sent from a center (not shown). The following illustrates VICS data as an example of broadcast data. The VICS data is divided at the road-side apparatus 7 and is to be transmitted. The wireless section 31 receives VICS data from a road-side apparatus 7 and provides the VICS data to the control section 30 of the DSRC on-vehicle apparatus 3. It is noted that, for example, the road-side apparatus 7 also requests the DSRC on-vehicle apparatus 3 to transmit travel information (i.e., probe information).

A card connector 38 is connected to the card authentication section 32. The card connector 38 is used for equipping an IC card 40 such as a credit card or an ETC card. Thus, it is possible that the card authentication section 32 performs data transfer with the IC card 40. It is noted that the IC card 40 includes a card control section 41 that performs data transfer with the card authentication section 32, and a card storage section 42 for storing information such as password.

The input operation section 33 is embodied as, for example, a push button type switch, and is configured to enable a user operation on the DSRC on-vehicle apparatus 3 such as switching of voice-output described later or the like and audio volume adjustment.

The speaker 34, for example, outputs audio of confirmation when the IC card 40 is attached to the card connector 38 or when an operation through the input operation section 33 has been performed, and notifies of the status of the DSRC on-vehicle apparatus 3 through sound or voice. The display section 35 is configured by a liquid crystal display device or the like, and notifies of the status of the DSRC on-vehicle apparatus 3 through the display of a predetermined state similar to the speaker 34.

The storage section 36 is a configuration for temporarily storing data received through the wireless section 31. As described hereinafter, the VICS data, which has been divided and transmitted from the road-side apparatus 7, is temporarily stored in the storage section 36, and then the divided VICS data is assembled as data in block units by the control section 30 of the DSRC on-vehicle apparatus 3.

The USB section 37 is an interface for performing communication with the navigation apparatus 5. The data assembled in block units in the DSRC on-vehicle apparatus 3 is provided to the navigation apparatus 5 from this USB section 37.

On the other hand, the navigation apparatus 5 is mainly configured by a navigation control section 50. The navigation control section 50 is configured as a so-called computer system just like the control section 30 of the DSRC on-vehicle apparatus 3, and includes a CPU, a ROM, a RAM, an I/O, and a bus line connecting them. A geomagnetic sensor 51, a gyroscope 52, a distance sensor 53, a GPS receiver 54, a map data input section 55, an operation switch group 56, a navigation USB section 57, an external memory 58, and a guidance section 59 are connected to the navigation control section 50.

The geomagnetism sensor 51 is a configuration for detecting the direction of a vehicle by terrestrial magnetism. In addition, the gyroscope 52 outputs a detecting signal in response to the angular velocity of the rotary motion applied to a vehicle. Moreover, the distance sensor 53 outputs the travelling distance of a vehicle. Furthermore, the GPS receiver 54 receives a transmission signal from an artificial satellite for GPS (Global Positioning System), and detects the position coordinate and altitude of a vehicle. With this configuration, the navigation control section 50 is capable of calculating, for example, the present position, direction, and speed of a vehicle.

The map data input section 55 is a configuration for inputting map data to the navigation control section 50. The map data is stored in a DVD-ROM or the like, and the map data is inputted to the navigation control section 50 through the map data input section 55. An HDD, a CD-ROM or the like in addition to a DVD-ROM may also be used. The map data includes road data, drawing data, data for map matching, data for route guidance and the like.

The operation switch group 56 is a configuration for inputting a variety of instructions provided from a user, and is embodied as a physical push button type switch or the like. Alternatively, the operation switch group 56 may be embodied as a touch panel integrally configured with a display device of the guidance section 59.

The navigation USB section 57 is an interface for performing communication with the DSRC on-vehicle apparatus 3. The above-mentioned USB section 37 transmits data assembled in block units. A buffer 57a of the navigation USB section 57 stores the data.

The external memory 58 is embodied as an HDD or the like. The external memory 58 stores data read from the buffer 57a, temporarily stores the data read from the buffer 57a to assemble the data, and stores VICS data after assembly.

The guidance section 59 is a configuration for route guidance based on the searched route or guidance based on VICS data provided from the DSRC on-vehicle apparatus 3. Accordingly, the guidance section 59 is embodied as a speaker or a display device.

Figure 2:
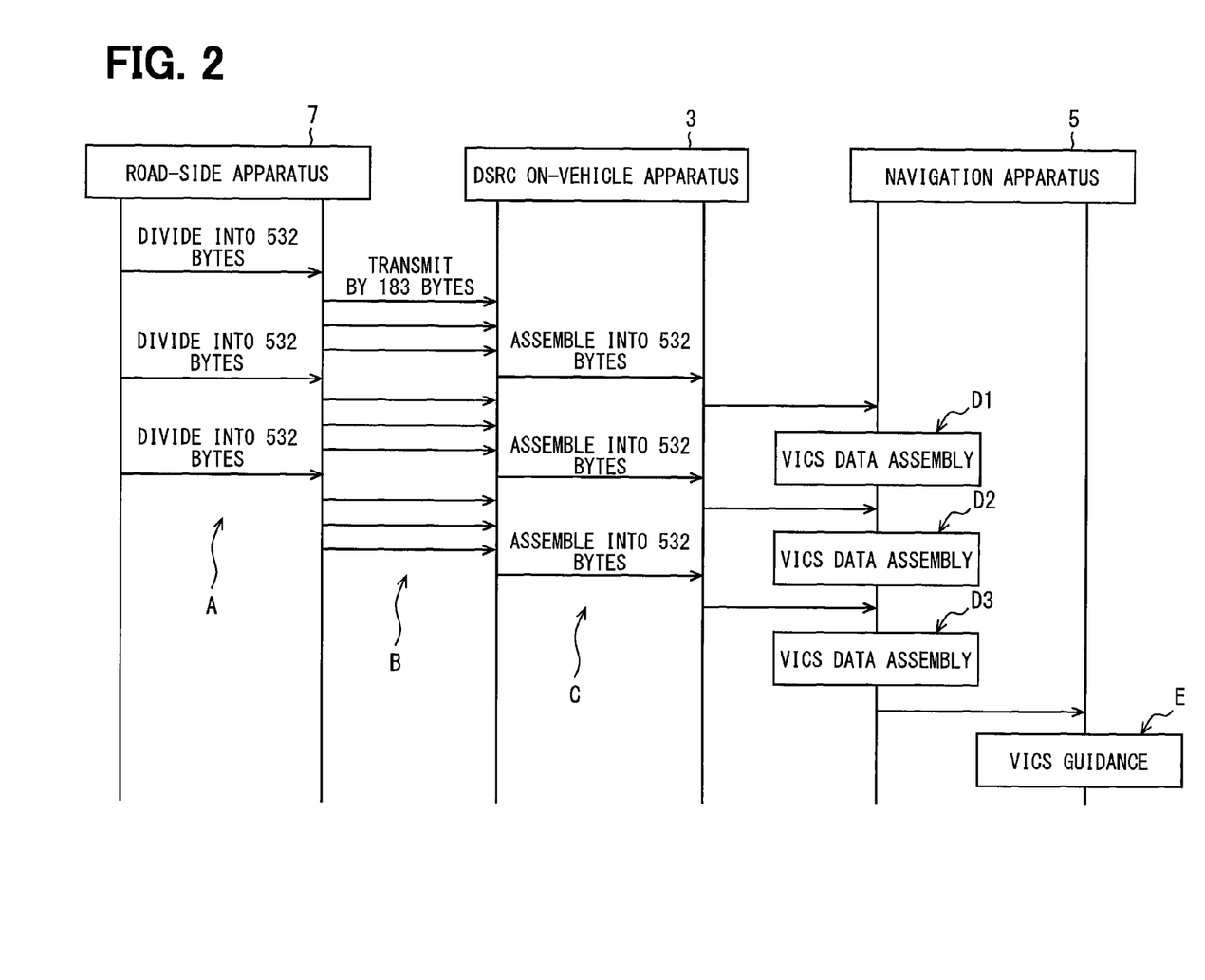
FIG. 2 is an explanatory drawing showing an ordinary sequence.

The following describes processing of VICS data transmitted from the road-side apparatus 7 with reference to FIG. 2.

The VICS data from a center is transmitted to the road-side apparatus 7 as shown in FIG. 2. The VICS data holds an identification number like ID2 or ID3. The road-side apparatus 7 divides VICS data into block units, each of which has 532 bytes, as indicated by sign A. In FIG. 2, one piece of VICS data is divided into three block units of data.

The road-side apparatus 7 subsequently divides 532 bytes of data in one block unit by 183 bytes and transmits the data as indicated by sign B. The transmission with 183 bytes is based upon the DSRC standards.

Thus, the DSRC on-vehicle apparatus 3 receives data transmitted with 183 bytes from the road-side apparatus 7 through the wireless section 31. The control section 30 of the DSRC on-vehicle apparatus 3 stores the data transmitted with 183 bytes from the road-side apparatus 7 into the storage section 36. Subsequently, the data is assembled as 532 bytes of data in one block unit as indicated by sign C. The 532-byte is also based on the DSRC standards.

Next, the DSRC on-vehicle apparatus 3 transmits 532 bytes of data in one block unit to the navigation apparatus 5. More specifically, the data in block units having 532 bytes is transmitted to the navigation apparatus 5 by 64 bytes at a time based upon a specification of USB. Referring to FIG. 1, the control section 30 of the DSRC on-vehicle apparatus 3 transmits data to the navigation USB section 57 of the navigation apparatus 5 through the USB section 37. The data provided by 64 bytes at a time is stored into the buffer 57a of the navigation USB section 57. Subsequently, when the data having 532 bytes is stored in the buffer 57a, the data in one block unit is read out at the navigation control section 50, and the assembly of VICS data is performed. Accordingly, whenever data in one block unit having 532 bytes is received, processing (i.e., processing indicated by signs D1 through D3) performed by the navigation apparatus 5 occurs. Then, the navigation apparatus 5 performs guidance processing indicated by sign E after completing the assembly of VICS data.

The following describes the data in block units provided from the DSRC on-vehicle apparatus 3 to the navigation apparatus 5.

Figure 3A:
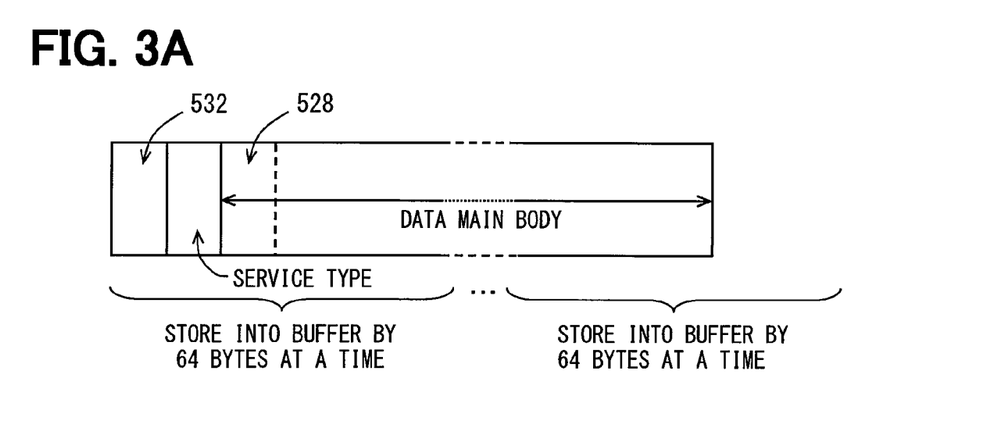
FIG. 3A through FIG. 3C are explanatory drawings showing data in block units.

As shown in FIG. 3A, the head includes the information "532" indicating that the size of the whole data body is 532 bytes. Then, the information indicative of a service type follows the head, and the data body follows after that. The header portion of the data body includes the information "528" indicating that the size of the data body is 528 bytes.

Such data in block units is stored in the buffer 57a of the navigation USB section 57 by 64 bytes at a time. As the data is stored by 64 bytes at a time into the buffer 57a, since the whole data body is 532 bytes, the last 20-byte corresponds to a fractional unit. As a fractional unit less than 64 bytes is generated in this way, the data in block units is read out by the navigation control section 50, and the assembly of VICS data is performed. In other words, a trigger for passing control to the navigation control section 50 corresponds to a fractional unit generated at the end portion of data.

Figure 3B:
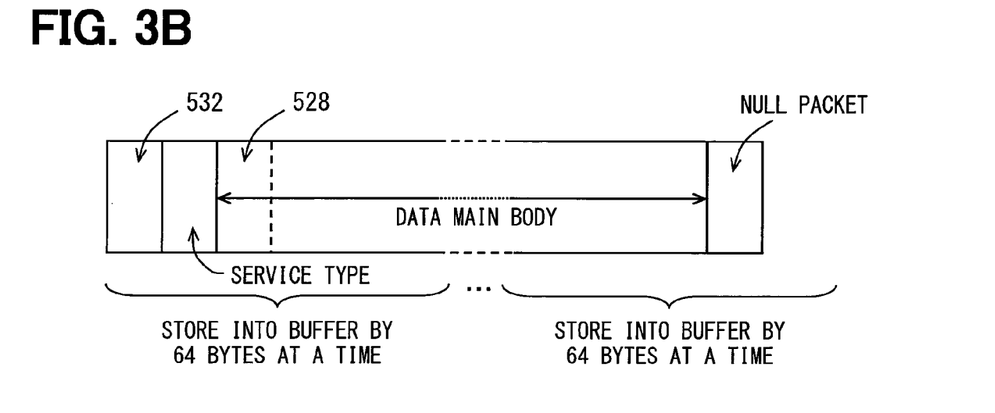

In addition, the method of adding a NULL packet to the end portion of data as indicated in FIG. 3B is regarded as an alternative method. In this case, the end of data in block units is determined by a NULL packet. In other words, as a NULL packet is detected, the data in block units is read out by the navigation control section 50, and the assembly of VICS data is performed. In other words, a trigger for passing control to the navigation control section 50 corresponds to a NULL packet to be added at the end of data.

The present embodiment, by using such mechanism of USB, is configured not to generate data processing performed by the navigation control section 50, the data processing being generated whenever the data in one block unit having 532 bytes is generated.

When the fractional unit less than 64 bytes as shown in FIG. 3A serves as a trigger for passing control to the navigation control section 50, dummy data having 44 bytes is added to the end of data, and the size of the whole data body becomes 576 bytes. Since "576" is a multiple of "64", as the data is stored by 64 bytes at a time into the buffer 57a, the above fractional unit is not generated. Thus, a trigger for passing control to the navigation control section 50 is not generated. Accordingly, data having dummy data in one block unit having 576 bytes is stored repeatedly in the buffer 57a. In other words, a plurality of pieces of data in block units are stored into the buffer 57a as a series of data to be packed.

On the other hand, when a NULL packet added to the end of data as shown in FIG. 3B serves as a trigger to pass control to the navigation control section 50, the NULL packet is not added. Thus, a trigger for passing control to the navigation control section 50 is not generated. Accordingly, a plurality of pieces of data in block units are stored into the buffer 57a as a series of data to be packed in the same way.

Figure 4:
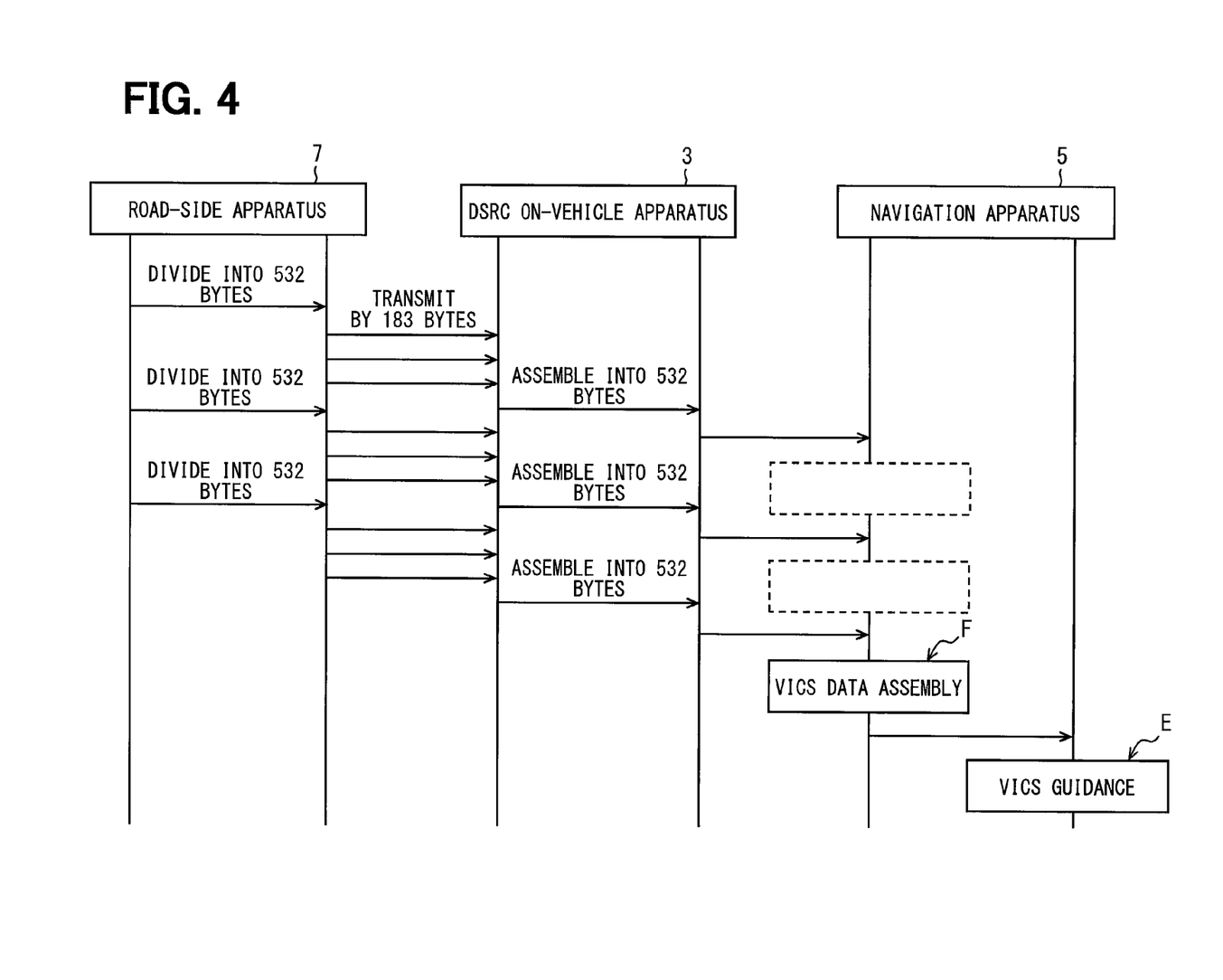
FIG. 4 is an explanatory drawing showing a sequence as a characteristic.

As a result, as shown in FIG. 4, the navigation apparatus 5 does not generate data processing in block units as indicated by broken lines, and a series of data to be packed are collectively processed as indicated by sign F. Processing on a series of data to be packed is performed at a timing in which, for example, the load in the navigation apparatus 5 gets smaller. Also in this case, the navigation apparatus 5 performs guidance processing indicated by sign E after completing the assembly of VICS data.

Figure 5:
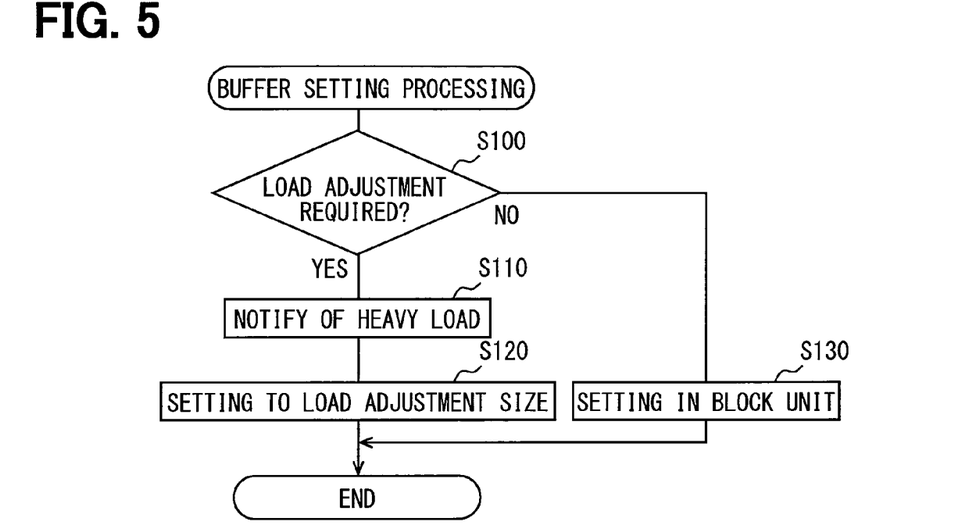
FIG. 5 is a flowchart showing buffer setting processing in a navigation apparatus.

The following describes buffer setting processing in the navigation apparatus 5 based on the flowchart in FIG. 5. This buffer setting processing is repeatedly performed at prescribed time intervals by the navigation control section 50.

Initially in S100, it is determined whether load adjustment is required. The determination is performed based on, for example, the usage rate of a CPU constituting the navigation control section 50. When it is determined that load adjustment is required herein (i.e., "YES" at S100), processing is moved to S110. On the other hand, when it is determined that load adjustment is not required (i.e., "NO" at S100), the buffer size is set in block units (maximum 532 bytes) at S130, and buffer setting processing is completed subsequently.

In S110, it is notified of having a heavy load. This processing notifies of load adjustment being required to the DSRC on-vehicle apparatus 3 when the CPU of the navigation control section 50 is in a heavy-load state.

Subsequently in S120, a buffer size is set to a load adjustment size. Herein, a buffer size is set in the form of a multiple of a block unit such that a plurality of pieces of data in block units are stored as a series of data to be packed. Buffer setting processing is completed after completing processing in S120.

Figure 6:
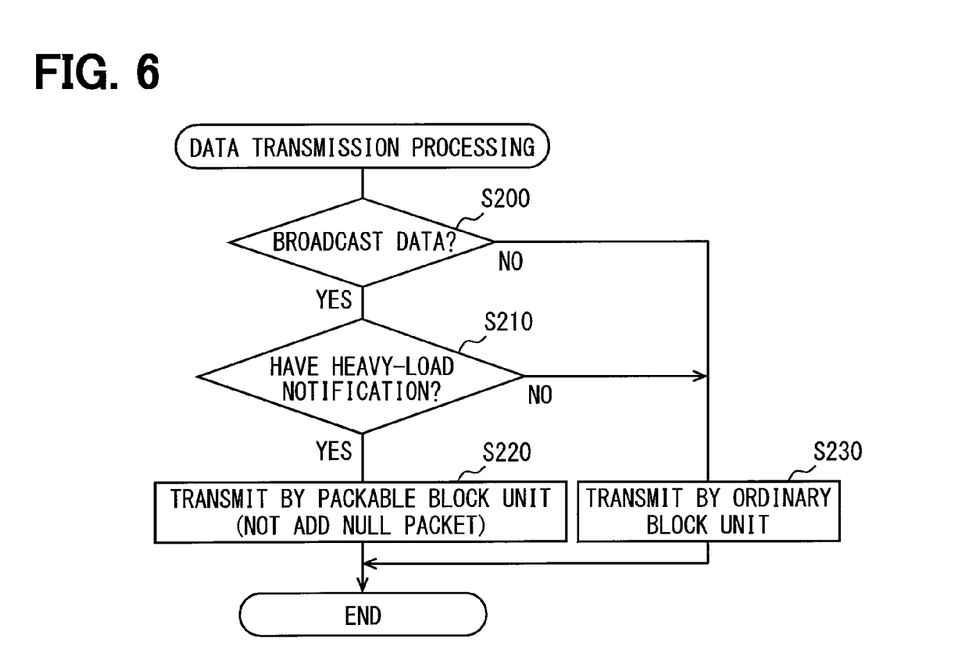
FIG. 6 is a flowchart showing data transmission processing in a DSRC on-vehicle apparatus.

The following describes data transmission processing in the DSRC on-vehicle apparatus 3 with reference to the flowchart in FIG. 6. This data transmission processing is performed by the control section 30 of the DSRC on-vehicle apparatus 3 when data is transmitted from the road-side apparatus 7.

Initially in S200, it is determined whether the data is broadcast data. Positive determination is made when the data is data of a broadcast communication service such as VICS data. On the other hand, negative determination is made when the data is data of an individual communication service such as a transmission request of travelling information (i.e., probe information) from the road-side apparatus 7. When it is determined that the data is broadcast data herein (i.e., "YES" at S200), processing is moved to S210.

On the other hand, when it is determined that the data is not broadcast data (i.e., "NO" at S200), processing is moved to S230.

In S210, it is determined whether a heavy-load notification has been made. This processing corresponds to S110 in FIG. 5, and positive determination is made when, for example, having of a heavy-load within a predetermined period is informed from the navigation apparatus 5. When it is determined that a heavy-load notification has been made herein (i.e., "YES" at S210), processing is moved to S220. On the other hand, when it is determined that a heavy-load notification has not been made (i.e., "NO" at S210), processing is moved to S230.

Figure 3C:
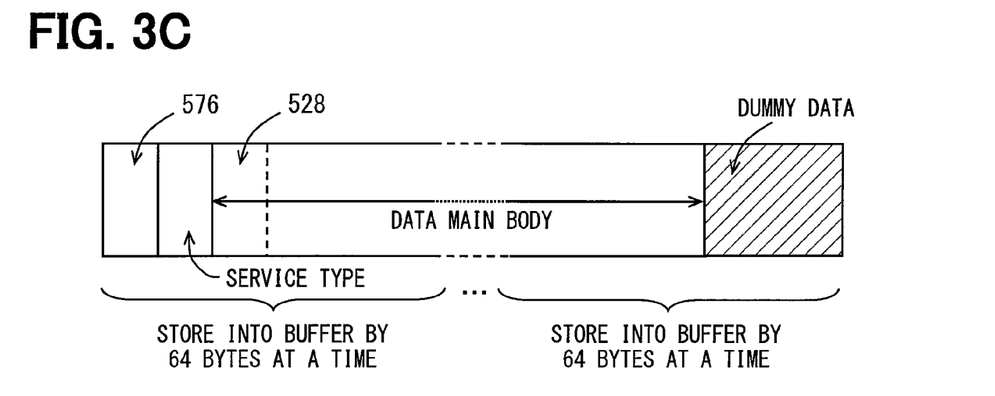

In S220, data is transmitted in packable block units. This processing is performed for transmitting VICS data in block units, each of which has 576 bytes, as shown in FIG. 3C when a trigger for passing control to the navigation control section 50 is generated as a fractional unit at the end of data. In addition, when a trigger for passing control to the navigation control section 50 is generated as a NULL packet at the end of data, a NULL packet is not added and VICS data is transmitted. Data transmission processing is completed subsequent to the completion of processing of S220.

On the other hand, in S230, data is transmitted in ordinary block units. This processing is for transmitting VICS data in block units, each of which has 532 bytes, as shown in FIG. 3A or 3B. Data transmission processing is terminated subsequent to the completion of processing of S230.

Figure 7:
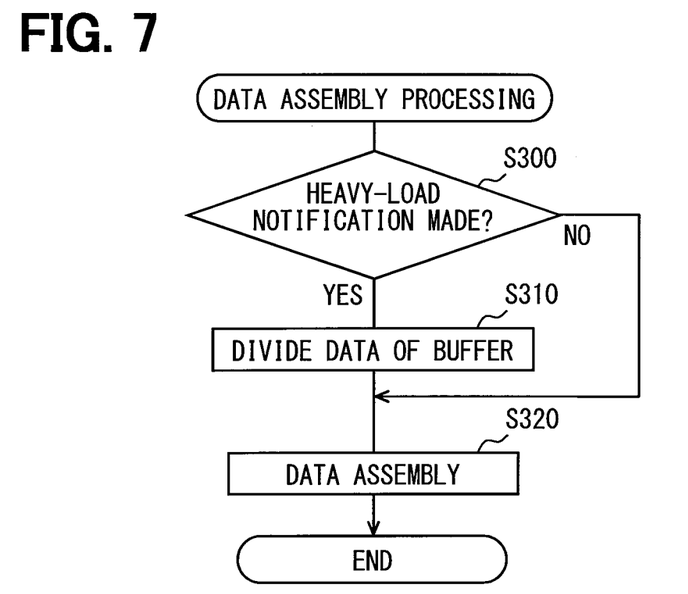
FIG. 7 is a flowchart showing data assembly processing in the navigation device.

The following describes data assembly processing in the navigation apparatus 5 based on the flowchart in FIG. 7. The data assembly processing is performed at a timing either in which the reception of data in block units is determined or in which the processing load of the navigation control section 50 gets smaller.

Initially in S300, it is determined whether a heavy-load notification has been made. This processing corresponds to S110 in FIG. 5, and positive determination is made when, for example, a heavy-load notification has been made within a predetermined period. When it is determined that a heavy-load notification has been made herein (i.e., "YES" at S300), processing is moved to S310. On the other hand, when a heavy-load notification has not been made (i.e., "NO" at S300), processing is moved to S320 without performing processing of S310.

In S310, data in the buffer 57a is divided. This processing corresponds to the case when a heavy-load notification has been made. When a heavy-load notification has been made, the data in blocks units from the DSRC on-vehicle apparatus 3 is stored in in the buffer 57a of the navigation USB section 57 as a series of data to be packed. Therefore, a series of data to be packed are divided.

In S320, the assembly of data is performed. Main data having 528 bytes is extracted from the data in block units herein, and then the divided VICS data is assembled. Data assembly processing is completed subsequent to the completion of processing of S320.

According to the present embodiment as described above in detail, when the data from the road-side apparatus 7 is broadcast data such as VICS service (i.e., "YES" at S200 in FIG. 6), it is determined whether a heavy-load notification from the navigation apparatus 5 has been made (at S210). When it is determined that a heavy-load notification has been made herein (i.e., "YES" at S210), broadcast data is transmitted in packable block units (at S220). A pack refers to the matter in that a plurality of pieces of data in block units are stored into the buffer 57a as a series of data without the generation of data processing on each of block units in the navigation apparatus 5. During this time, in the navigation apparatus 5, an assembly device 50a divides a series of data stored into the buffer 57a and then assemblies the divided data (at S310, S320 in FIG. 7).

In other words, the DSRC on-vehicle apparatus 3 includes a determination device 30a that determines whether load reduction in data processing of the navigation apparatus 5 is required, and a transmission device 30b that transmits a plurality of pieces of data as a series of data such that data reception in block units has not been determined in the navigation apparatus 5 when load reduction at the determination device 30a is determined to be required. In addition, the navigation apparatus 5 includes the assembly device 50a that divides a plurality of pieces of data to be transmitted as a series of data in the transmission device 30b and then assemblies the divided data.

In other words, the navigation apparatus 5 performs data processing whenever data reception in block units is determined; however, in a heavy-load state, the generation of data processing on each of block units is restricted to prevent data reception in block units from being determined in the navigation apparatus 5. Accordingly, when the DSRC on-vehicle apparatus 3 transmits data to the navigation apparatus 5, the data can be certainly transmitted even when the processing load in the navigation apparatus 5 gets larger.

In particular, the navigation apparatus 5 starts data processing when data of a fractional unit less than 64 bytes is transferred under a condition that data in block units is transferred by 64 bytes as a transfer unit. Accordingly, the transmission device 30b of the DSRC on-vehicle apparatus 3 transmits a plurality of pieces of data, which are represented by block units having 576 bytes as a multiple of 64 bytes as a transfer unit (at S220 in FIG. 6). In other words, the navigation apparatus 5 is configured to determine data reception in block units as the data of a fractional unit less than a transfer unit is transferred assuming that data in block units is transferred by a predetermined transfer unit. The transmission device 30b transmits a plurality of pieces of data such that a block unit is a multiple of a transfer unit. Accordingly, the generation of data processing on each of block units can be comparatively easily restricted.

Alternatively, the navigation apparatus 5 determines data reception in block units by a NULL packet as end information indicating the end of a block unit. Thus, the transmission device 30b of the DSRC on-vehicle apparatus 3 transmits a plurality of pieces of data such that a NULL packet is not added (at S220 in FIG. 6). In other words, the navigation apparatus 5 is configured to determine data reception in block units according to end information indicating the end of a block unit, and the transmission device 30b transmits a plurality of pieces of data such that end information is not added. Accordingly, the generation of data processing on each of block units can be comparatively easily restricted.

According to the present embodiment, it is determined whether the data from the road-side apparatus 7 is broadcast data (at S200 in FIG. 6). When the data is broadcast data (i.e., "YES" at S200), the data in packable block units is transmitted (at S220). In other words, the determination device 30a determines that load reduction is required when the data from the road-side apparatus 7 is broadcast data. Accordingly, the processing load in the navigation apparatus 5 can be reduced when the data is broadcast data to be transmitted from the road-side apparatus 7 unilaterally.

Moreover, the present embodiment determines whether load reduction is required in the navigation apparatus 5 (at S100 in FIG. 5). If it is determined that load reduction is required herein (i.e., "YES" at S100), a heavy-load notification is made (at S110). In the DSRC on-vehicle apparatus 3, if a heavy-load notification is made (i.e., "YES" at S210 in FIG. 6), data in packable block units is transmitted (at S220). In other words, the navigation apparatus 5 includes a notification device 50b for notifying of having a heavy load to the communication device when a heavy-load state affects data processing. The determination device 30a determines that load reduction is required when a heavy-load notification according to the notification device 50b has been made. Accordingly, the processing load in the navigation apparatus 5 can be reduced when the processing load in the navigation apparatus 5 gets larger.

According to the present embodiment, if it is determined that load adjustment is required in the navigation apparatus 5 (i.e., "YES" at S100 in FIG. 5), a buffer size is set to the load adjustment size (at S120). On the other hand, if it is determined that load adjustment is not required (i.e., "NO" at S100), a buffer size is set by block units. In other words, the navigation apparatus 5 includes a changing device 50c for changing a buffer size prior to the transmission of a series of data performed by the transmission device 30b. Accordingly, since a buffer size is set as necessary, the buffer 57a can be effectively used without being occupied wastefully.

The present disclosure described above is not restricted to any of embodiments mentioned above. A variety of modes can be carried out without departing from the technical scope.

According to the above embodiment, it is determined whether load adjustment is required in the navigation apparatus 5 (at S100 in FIG. 5). If load adjustment is required (i.e., "YES" at S100), a heavy-load notification is made (at S110). In the DSRC on-vehicle apparatus 3, if a heavy-load notification has been made (i.e., "YES" at S210 in FIG. 6), data is transmitted in block units which can be packed (at S220). In other words, negotiation is made between the navigation apparatus 5 and the DSRC on-vehicle apparatus 3.

On the other hand, if the data from the road-side apparatus 7 is broadcast data without performing negotiation, the DSRC on-vehicle apparatus 3 may be configured to transmit data in packable block units. In this case, it is considered that a notice of the result is made, for example, before or after transmission of broadcast data from the DSRC on-vehicle apparatus 3 to the navigation apparatus 5.

While the present disclosure has been described with reference to embodiments thereof, it is to be understood that the disclosure is not limited to the embodiments and constrictions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:
a communication device that receives data from a road-side apparatus placed on a road and transmits the data as a plurality of data items in block units; and
a processor that is connected to the communication device for enabling data communication with the communication device, and that starts data processing when the processor determines data reception of the block units from the communication device,
wherein the communication device includes:

a determination device that determines whether load reduction in the data processing performed by the processor is required; and a transmission device that, when the determination device determines that the load reduction is required, transmits the plurality of data items as a series of data items such that reception of the plurality of data items in the block units has not been determined by the processor, and wherein the processor includes an assembly device, which divides the plurality of data items as the series of data items transmitted from the transmission device and assembles the divided plurality of data items, wherein each of the plurality of data items is transferred by a transfer unit, which is predetermined, wherein the processor determines reception of the plurality of data items in the block units when a fractional unit of the data is smaller than the transfer unit in data size is transferred, and wherein the transmission device transmits the plurality of data items such that each of the block units is an integral multiple of the transfer unit in data size.

2. The communication system according to claim 1, wherein the determination device determines that the load reduction is required when the data from the road-side apparatus is broadcast data as data of a broadcast communication service.

3. The communication system according to claim 1, wherein the processor further includes a notification device that notifies of having a heavy load to the communication device when the processor is in a heavy-load state that affects the data processing, and wherein the determination device determines that the load reduction is required when a heavy-load notification performed by the notification device is made.

4. A communication system comprising:

a communication device that receives data from a road-side apparatus placed on a road and transmits the data as a plurality of data items in block units; and a processor that is connected to the communication device for enabling data communication with the communication device, and that starts data processing when the processor determines data reception of the block units from the communication device, wherein the communication device includes:

a determination device that determines whether load reduction in the data processing performed by the processor is required; and a transmission device that, when the determination device determines that the load reduction is required, transmits the plurality of data items as a series of data items such that reception of the plurality of data items in the block units has not been determined by the processor, and wherein the processor includes an assembly device, which divides the plurality of data items as the series of data items transmitted from the transmission device and assembles the divided plurality of data items, wherein the processor determines reception of the data item in block units according to end information indicative of end of each block unit, and wherein the transmission device transmits the plurality of data items such that the end information is not added.

5. A communication system comprising:

a communication device that receives data from a road-side apparatus placed on a road and transmits the data as a plurality of data items in block units; and a processor that is connected to the communication device for enabling data communication with the communication device, and that starts data processing when the processor determines data reception of the block units from the communication device, wherein the communication device includes:

a determination device that determines whether load reduction in the data processing performed by the processor is required; and a transmission device that, when the determination device determines that the load reduction is required, transmits the plurality of data items as a series of data items such that reception of the plurality of data items in the block units has not been determined by the processor, and wherein the processor includes an assembly device, which divides the plurality of data items as the series of data items transmitted from the transmission device and assembles the divided plurality of data items, and wherein the processor further includes a changing device for changing a buffer size before the transmission device transmits the series of data items.

* * * * *